United States Patent

[11] 3,593,648

| [72] | Inventor | Roy J. Walters |
| | | 2462 Worden St., San Diego, Calif. 92110 |
| [21] | Appl. No. | 739,681 |
| [22] | Filed | June 25, 1968 |
| [45] | Patented | July 20, 1971 |

[54] COOKING APPLIANCE
6 Claims, 5 Drawing Figs.

[52] U.S. Cl. .................................................. 99/332,
99/107, 99/349, 99/390, 99/391, 99/400, 99/402, 99/446
[51] Int. Cl. .................................................. A47j 27/62
[50] Field of Search .......................................... 99/327,
332, 335, 372, 375, 377, 380, 385, 389, 390, 391,
393, 400, 402, 422, 423, 424, 425, 349, 446, 426,
427, 107

[56] References Cited
UNITED STATES PATENTS

| 1,540,628 | 6/1925 | Hurxthal et al. | 99/393 X |
| 1,729,937 | 10/1929 | Ginder | 99/390 |
| 1,720,451 | 7/1929 | Smith | 99/332 |
| 1,832,831 | 11/1931 | Ginder | 99/390 |
| 1,912,353 | 5/1933 | Howe | 99/390 X |
| 1,979,845 | 11/1934 | Schallis | 99/332 |
| 2,102,097 | 12/1937 | Sherman | 99/390 |

FOREIGN PATENTS

| 1,320,733 | 2/1963 | France | 99/389 |
| 80,828 | 5/1963 | France | 99/390 |

*Primary Examiner*—Billy J. Wilhite
*Attorneys*—John W. Michael, Gerrit D. Foster, Bayard H. Michael, Paul R. Puerner, Joseph A. Gemignani, Andrew O. Riteris and Spencer B. Michael ABSTRACT: A cooking appliance comprising a base stand having a pair of electrical heating units pivotally mounted thereon in a substantially upright position. The heating units are pivotally mounted along the lower edges thereof and are adapted to be opened and closed in a manner similar to a woman's purse. A portable food supporting rack is removably positioned in an upright position between the heating units and a drip pan is removably mounted beneath the rack. With the rack positioned between the heating units the units are pivoted to closed position bringing the food (such as bacon) on the rack in close contact with the heating units. The heating units are locked in closed position by a timer controlled latch mechanism adapted to release the units for movement to open position after a preset time interval.

PATENTED JUL 20 1971  3,593,648
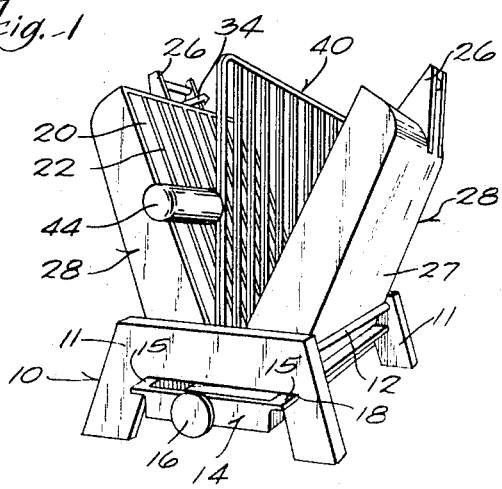
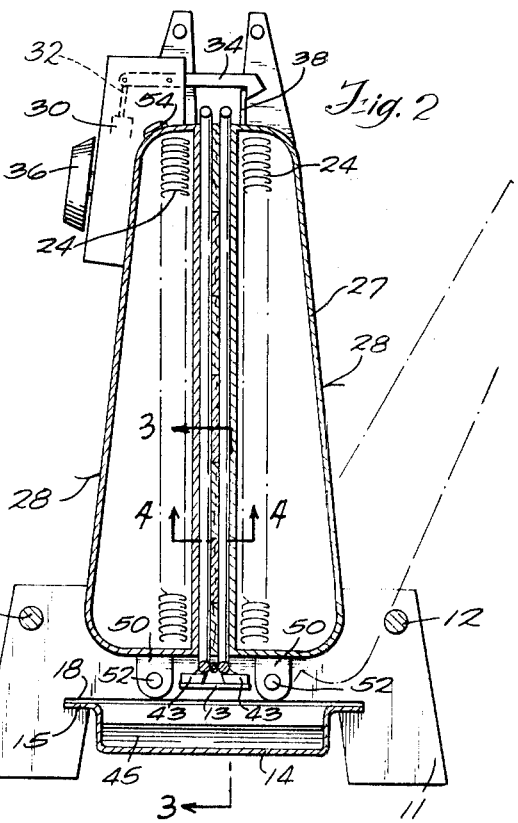
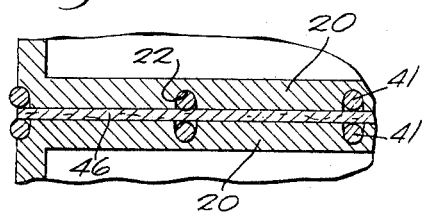
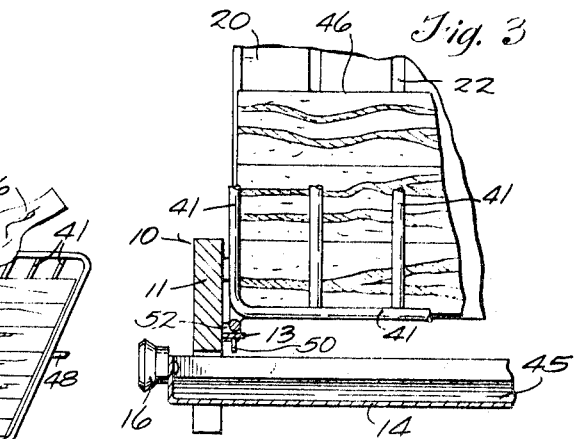
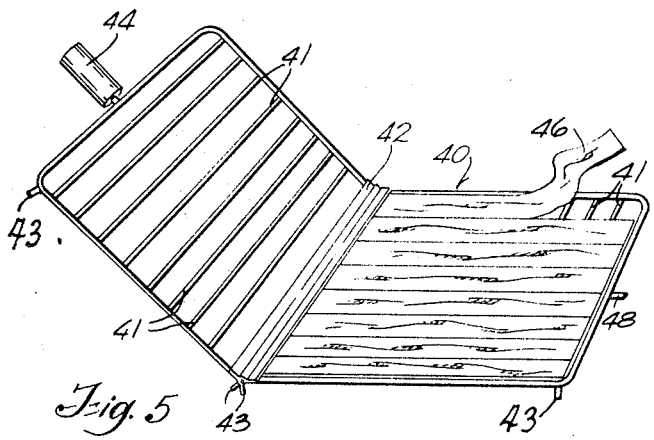
Inventor
Roy J. Walters
By Paul R. Puerner
Attorney

COOKING APPLIANCE

BACKGROUND OF THE INVENTION

1. Field of the Invention

This invention relates to electric cooking appliances particularly adapted for cooking bacon strips.

2. Description of the Prior Art

The conventional method for preparing bacon is to fry the strips in some kind of a pan or griddle. Uniform cooking is difficult with this method due to the almost unavoidable variation of cooking time for each strip and the tendency of bacon to shrivel and curl during cooking causing certain portions of each slice to receive more or less heat than other portions thereof. The collection of hot fat in the pan with its consequent spattering and fumes is undesirable and the actual cooking of the slices in the hot fat tends to saturate the cooked slices with grease.

SUMMARY OF THE INVENTION

A cooking appliance comprising a base member having a pair of platelike heating units movably mounted thereon in a substantially vertical position in face-to-face relationship. A portable food supporting rack is provided for placing in an upright position between the heating units. The units are adapted for movement between a closed position wherein the units are in close contact with the food on the rack for cooking thereof and an open position wherein the units are spaced from the rack to permit insertion and removal thereof. The rack and heating units are constructed to provide substantially surface-to-surface contact between the heating units and the food (such as bacon strips) on the rack. A drip pan is removably mounted beneath the rack to collect dripping from the food. The heating units are locked in closed position by a timer controlled latch mechanism adapted to release the units for movement to open position after a preset time interval.

With the above described appliance, a number of bacon strips can be cooked simultaneously under closely controlled conditions. The tendency of the strips to shrivel and curl is substantially reduced by the close holding action exerted on the strips by the heating units. The hot grease produced during cooking is quickly and continuously carried away to thus eliminate the grease spattering problem and substantially reduce the amount of grease in the finished product.

Other objects and advantages will be pointed out in, or be apparent from, the description and claims, as will obvious modifications of the single embodiment shown in the drawings.

DESCRIPTION OF THE DRAWINGS

FIG. 1 is a perspective view of an electrical cooking appliance embodying the present invention with the appliance in an open, noncooking position;

FIG. 2 is a vertical sectional view of the electrical cooking appliance in a closed or cooking position;

FIG. 3 is a fragmentary sectional view taken on line 3-3 of FIG. 2;

FIG. 4 is a fragmentary sectional view taken on line 4-4 of FIG. 2; and

FIG. 5 is a perspective view of a removable wire rack in an open position.

DESCRIPTION OF THE PREFERRED EMBODIMENT

The electric cooking appliance is comprised of a pair of vertically positioned heating units 28 pivotally mounted on a base stand 10. Stand 10 is comprised of a pair of support leg member 11 secured to each other by rods 12. A drip pan 14 having a handle 16 is removably mounted in the lower portion of stand 10 by means of flanges 15 on the pan adapted for sliding engagement with grooves 18 in support legs 11 as clearly shown in FIG. 2. The drip pan and stand may be made of any suitable material such as heat resistant plastic or metal. It is important to note that the pan when in its installed position will be spaced above the surface on which the appliance is mounted.

Each heating unit 28 is comprised of a grid plate member 20 and a housing member 27 which together form an enclosure for a plurality of heating elements 24. Heating units 28 are pivotally mounted on stand 10 with the grid plates in face-to-face relationship by means of pivot pins 52 on the inner faces of leg members 11, which pins extend through ears 50 on housing members 27 as clearly shown in FIG. 2. Grid plates 20 are preferably in the form of aluminum stampings having flat exposed surfaces provided with a plurality of vertically extending spaced grooves 22 the significance of which will be explained in detail hereinafter. Heating elements 24 may be of any suitable design and are electrically connected to a source of electrical power by a suitable cord and plug of conventional design (not shown). Each heating unit 28 is provided with a handle 26 mounted on the top portion thereof to facilitate operation of the appliance. Handles 26 are preferably made from a heat resistant plastic material to permit manipulation of the heating units with the heating elements 24 energized.

It is important to note at this point that heating units 28 are pivotally mounted on stand 10 in a substantially vertical position and are designed to pivot between a closed position (FIG. 2) to an open position (FIG. 1) in a manner similar to the opening and closing of a woman's purse. The outward pivoting of the units is limited by rods 12 which are positioned to provide an included angle of about 30 degrees to 45 degrees between the two units when in an open position. The heating units are designed so that the center of gravity of each unit lies to the outward side of pivot pins 52 so that the units will pivot readily from closed to open position by the force of gravity to thus eliminate the need for springs or other means to accomplish such opening movement.

A rack assembly 40 is provided for holding the food to be coked. The rack 40 is comprised of a pair of wire grid members 41 hinged together by a hinge 42. The rack is provided with an insulated handle 44 mounted on one of the grid members 41 and adapted for engagement with a catch member 48 on the other grid member to facilitate locking the two grid members together in closed position. As shown in FIGS. 1 and 2, the rack 40 is adapted for insertion as a unit into the appliance in an upright position between the heating units 28. The rack can be supported in the appliance by any suitable means such as projecting ledges 13 on support legs 11 of the stand as shown in FIGS. 2 and 3. The rack is provided with pairs of support legs 43 adapted to rest on ledges 13 to thereby support the rack in a stable manner on the stand even when the heating units are in open position (FIG. 1).

It is important to note at this point that the wire grid members 41 of rack 40 are constructed so that the individual elements which make up the grid will register with the grooves 22 in grid plates 20 of the heating units as clearly shown in FIG. 4. As will be explained hereinafter, this relationship will provide intimate contact between the faces of grid plates 20 and the food held between the grid members 41 of rack 40.

To automatically control the heating cycle, a timer controlled latch mechanism for heating units 28 is provided. Such mechanism is comprised of a mechanical timer 30 having a selector knob 36 mounted on the upper portion of one of the heating units as shown in FIG. 2. Timer 30 may be of any conventional design and since its detailed construction is not a part of this invention it will not be described herein. Timer 30 is operatively connected to a pivotally mounted latch member 34 by means of an actuating lever 32, which lever is adapted to be actuated by the timer at a preset time interval after the timer is started by the rotation of knob 36. Latch 34 is pivotally mounted on the left-hand heating unit 28 (as viewed in FIG. 2) and extends across the top of such unit for engagement with a latch catch member 38 on the right-hand heating unit when the units are in closed position. It will be apparent from the foregoing that with the parts in the closed position (FIG. 2) the timer can be set to provide automatic opening of the heating units at the end of a preselected time interval. This is accomplished by turning control knob 36 to the desired time setting. The timer 30 will thus be actuated and will operate to unlatch the heating units at the end of the preselected time interval at which time the unlatched units will pivot by the force of gravity from closed to open position.

The electrical heating circuit for the subject appliance (as in conventional electric cooking appliances) may include either a fixed or adjustable thermostat (not shown) to control the temperature of the grid plates 20 and may also include an on-off switch (not shown) and an indicator light 54 to facilitate control of the energization of the heating elements 24.

OPERATION

While the appliance described above be adapted for cooking various types of food, the particular embodiment shown and described herein is adapted for cooking slices of bacon identified by the reference number 46. The recommended procedure for cooking bacon is as follows.

The first step is to energize the heating elements 24 to thereby preheat grid plates 20. A grid plate temperature of about 400° F. has been found to produce good results.

Strips of bacon 46 are positioned between the grid members 41 of rack 40 as shown in FIG. 5. The grid members are then closed and locked together to hold the bacon strips securely in place in the rack.

With the appliance in open position, the loaded rack is positioned between the heating units 28 as shown in FIG. 1. The heating units are then closed manually by means of handles 26 and are latched together by the action of latch 34 and catch 38.

The next step is to set the timer 30 for the desired cooking or toasting cycle. Experiments have established that with bacon, a cooking cycle of 15—25 seconds provides good results. The selected cooking cycle will of course vary with the temperature of grid plates 20, the thickness of the bacon strips, the particular taste requirements of the user and other factors.

With the loaded rack 40 positioned between the closed heating units 28, the mating action of grids 41 in grooves 22 of plates 20 will bring the grid plate surfaces into flush contact with substantially the entire surface of each bacon strip. This important relationship together with the fact that both sides of each strip of the entire batch are subjected to a given amount of uniformly applied heat for any given cycle provides a greatly superior product when compared with prior methods of frying bacon. The cooked bacon will be less subject to linear shrinkage and shriveling than with present methods.

During the cooking cycle the liquid fat produced will be rapidly and immediately removed from the bacon due primarily to the vertical position of the food. The grease is collected in drip pan 14 which can be easily removed for disposal of the drippings as required. This rapid and continuous removal of the grease from the cooking bacon not only provides a superior product but eliminates the often dangerous spattering of the hot fat which is ever present with conventional methods.

At the end of the preset cooking cycle, the units 28 are automatically opened by the unlatching of latch 34 from catch 38 permitting the units to pivot outwardly by the force of gravity. The outward movement of grid plates 20 from the loaded rack 40 will effectively terminate the cooking cycle even though the rack is not immediately removed from the appliance. This is because the heat produced by the units will be readily dissipated upwardly into the surrounding atmosphere and will not be directed into the bacon other than at a very reduced rate sufficient to provide a warming action only. The rack can thus be removed at the convenience of the user, the bacon removed and a second loaded rack positioned in the appliance for cooking. A pair of racks 40 for each appliance (permitting one to be loaded while the other is in the appliance) will provide maximum production of cooked bacon.

Although but one embodiment of the present invention has been illustrated and described, it will be apparent to those skilled in the art that various changes and modifications may be made therein without departing from the spirit of the invention or from the scope of the appended claims.

I claim:
1. A cooking appliance comprising:
   a base member;
   a pair of platelike heating units movably mounted on said base member in a substantially vertical position in face-to-face relationship, said units adapted to move between a closed position wherein said units are closely adjacent to each other and an open position wherein said units are spaced from each other;
   a heating means for producing heat at the adjacent faces of said heating units;
   a portable food supporting rack assembly comprised of a pair of hingedly connected wire grid members, said assembly adapted for supporting food thereon in a substantially vertical plane, said rack assembly adapted to be removably positioned on said base member between said movable heating units so that the food held thereby will be in close contact with said heating units when in closed position and will be spaced from said heating units when in open position;
   said heating units each including a grid plate having a flat exposed heating face thereon, said plates each having a plurality of grooves in said exposed heating faces adapted for mating engagement with said grid member to provide substantially flush contact between said plates and the food held by said rack when said heating units are in closed position.

2. A cooking appliance according to claim 1 in which said base member includes a removable drip container positioned to collect drippings from the cooking food held by said rack assembly.

3. A cooking appliance according to claim 1 in which said heating units are pivotally mounted on said base member along the lower edges thereof to provide an open and closing action similar to that of a woman's purse.

4. A cooking appliance according to claim 3 in which the center of gravity of each heating unit lies to the outside of its pivot point so that said heating units will pivot outwardly to open position by the force of gravity.

5. A cooking appliance according to claim 1 in which a timer controlled latch mechanism is provided to lock the heating units in closed position and to release the units for movement to open position after a preset time interval.

6. A cooking appliance according to claim 5 in which said timer controlled latch mechanism includes latch member pivotally mounted on one of said heating units, a catch member adapted for locking engagement with said latch member mounted on the other heating unit and a mechanical timer operatively connected to said latch member and adapted to actuate said latch member after a preset time interval.